United States Patent [19]

Flanders et al.

[11] Patent Number: 5,368,353
[45] Date of Patent: Nov. 29, 1994

[54] PLANT CARRYING DEVICE

[75] Inventors: Bobby F. Flanders, McMinnville; John H. Fults, Rock Island, both of Tenn.

[73] Assignee: Botanico, Inc., McMinnville, Tenn.

[21] Appl. No.: 82,578

[22] Filed: Jun. 28, 1993

[51] Int. Cl.⁵ .............................................. A01G 23/04
[52] U.S. Cl. ...................................... 294/152; 47/76; 294/165
[58] 'Field of Search ................. 294/74, 149, 150, 152, 294/157, 165; 47/73–78; 111/106

[56] References Cited

U.S. PATENT DOCUMENTS

| | | | |
|---|---|---|---|
| 2,687,321 | 8/1954 | Toffolon | 294/157 X |
| 2,749,957 | 6/1956 | Smith | 294/150 |
| 3,214,072 | 10/1965 | Brown | 294/152 |
| 3,316,675 | 5/1967 | Cartwright, Jr. | 47/76 |
| 3,701,559 | 10/1972 | Marino et al. | 294/74 |
| 3,923,222 | 12/1975 | Groves | 294/157 |
| 4,054,166 | 10/1977 | Burke . | |
| 4,062,148 | 12/1977 | Edmonds, Jr. et al. | 47/76 |
| 4,140,257 | 2/1979 | Peterson . | |
| 4,209,092 | 6/1980 | Jones . | |
| 4,287,840 | 9/1981 | Weidner . | |
| 4,712,329 | 12/1987 | Anderson et al. . | |
| 4,726,468 | 2/1988 | Hesser et al. . | |
| 4,807,393 | 2/1989 | Bracken | 47/76 |

Primary Examiner—Dean J. Kramer
Attorney, Agent, or Firm—Banner, Birch, McKie & Beckett

[57] ABSTRACT

A carrying device is provided for lifting and transporting a balled and burlapped plant or the like without damaging the plant's root system or the top thereof. The carrying device includes at least two carrying straps having a fastening device at one end thereof. The straps are arranged such that they adjoin or intersect at a point beneath the balled plant. A carrying handle extending between the carrying straps is positioned on each side of the intersection point near the top shoulder of the plant. Thus, the plant can be securely lifted by the carrying handles without causing a loosening of the earth ball or burlap surrounding the plant roots.

19 Claims, 7 Drawing Sheets

PLANT CARRYING DEVICE

TECHNICAL FIELD

The present invention relates to a carrying device for plants and, more particularly, to a carrying device for lifting and transporting balled and burlapped plants without damage to the roots and soil therearound.

BACKGROUND OF THE INVENTION

In the commercial field of buying and selling grown plants, the plants, trees, shrubs and the like are dug up from the ground with a ball of earth still around the roots. The ball of earth is then wrapped in a material covering, such as burlap or other strong textile, in order to prevent the soil from dislodging during transport. A cord, baling twine, some type of wire basket, or other suitable container is then generally attached around the balled and burlapped plant in an attempt to avoid damage to the root system. Examples of containers previously used in the transporting of plants are shown in U.S. Pat. Nos. 4,209,092 and 4,712,329. In each of these instances, intensive labor is required to attach the cord, basket or container and handling of the balled plant is further complicated by the awkward shape of the plant and the lack of convenient handles.

Grown plants are generally balled and burlapped in the field, moved from the field to a loading area, and then moved again when loaded onto a customer's truck. During these moves the plant is either picked up by the top thereof or by the cord therearound. In both instances, the weight of the earth ball, which can be between thirty and one hundred twenty-five pounds, and the stresses placed thereon cause a loosening of the burlap covering and soil, thereby resulting in damage to the root system or the plant itself. Thus, the loosening of the cording or wire basket negates the positive aspects of its intended use.

SUMMARY OF THE INVENTION

The present invention overcomes these disadvantages by providing an easy to use plant carrying device. The plant carrying device includes at least a first carrying strap having a first fastening device secured at one end thereof, a second carrying strap having a second fastening device secured at one end thereof, and two carrying handles extending between the first and second carrying straps. The first and second carrying straps preferably cross over one another at an intersection point and one handle is disposed on each side of the intersection point. The first and second carrying straps are fastenable around a balled plant such that the first fastening device is connected to the second strap and the second fastening device is connected to the first strap. In so connecting the first and second carrying straps, the intersection point of the straps is positioned beneath the balled plant. One carrying handle is thereby positioned on each side of the earth ball for lifting and carrying the balled plant.

In a further embodiment of the invention, three carrying straps are provided with a fastening device at one end of each. Two carrying straps preferably cross over one another and fasten as described above, and the third carrying strap extends around the balled plant and fastens to the free end thereof. The carrying handles are thus positioned on each side of the balled plant for easily lifting the plant and moving it to a new location.

When the balled and burlapped plant is picked up using the carrying handles, all the weight of the ball is transferred to the intersection point of the straps beneath the balled plant. Accordingly, the plant top need not be touched during lifting and the weight of the ball is supported by the most stable place on the plant, thereby reducing the damage to the earth ball and the plant during transportation.

BRIEF DESCRIPTION OF THE DRAWINGS

The above description and other objects, advantages and features of the present invention will be more fully understood and appreciated by reference to the specification and accompanying drawings, wherein.

DETAILED DESCRIPTION OF THE PREFERRED EMBODIMENTS

Figure 1:
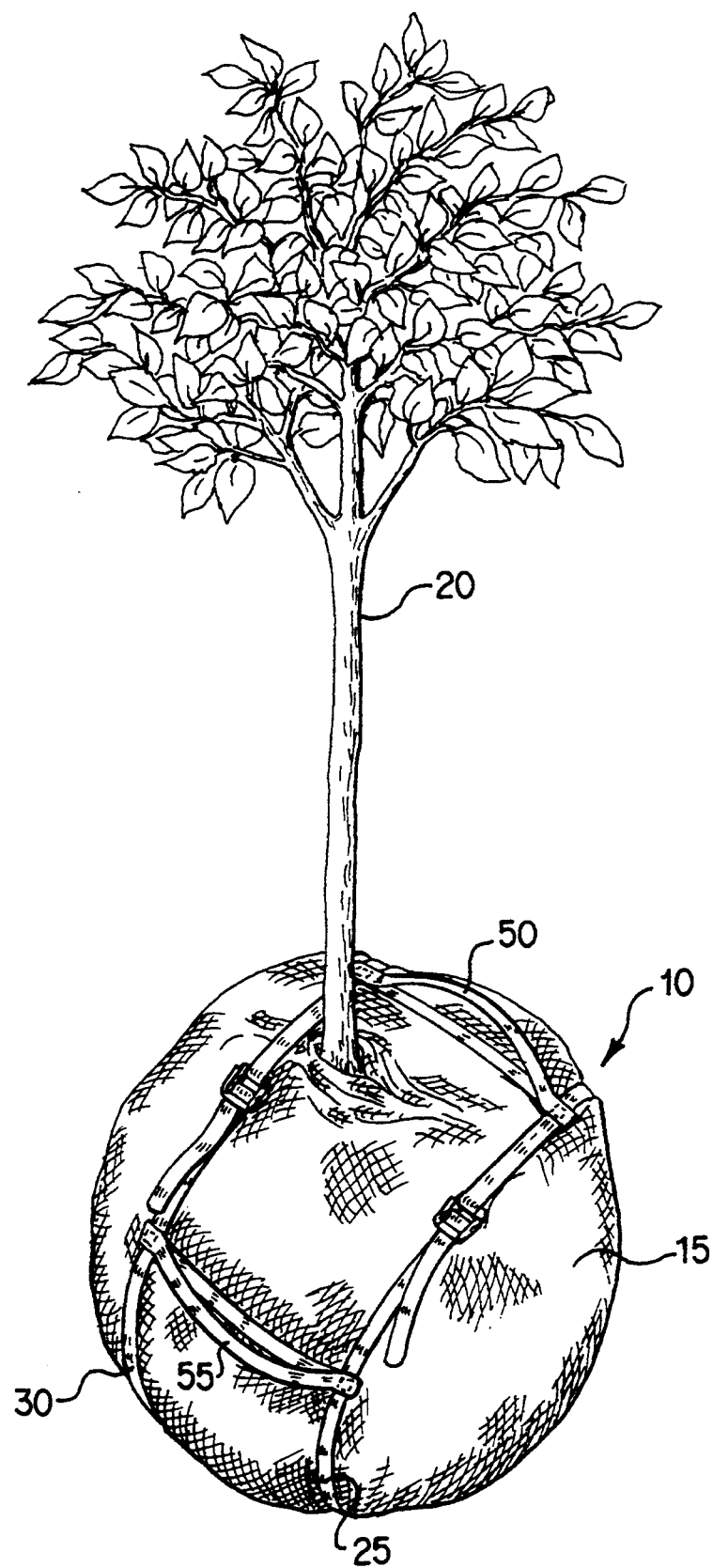
FIG. 1 is a top perspective view of a plant carrying device according to one embodiment of the present invention when fastened around a balled plant.
Figure 2:
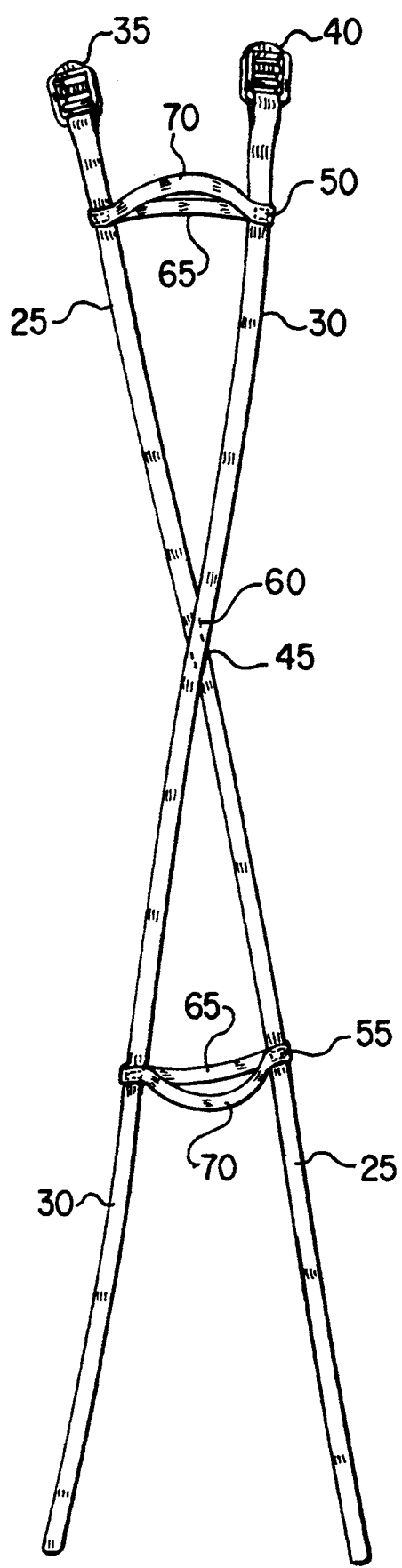
FIG. 2 is an elevational view of the plant carrying device shown in FIG. 1.
Figure 3:
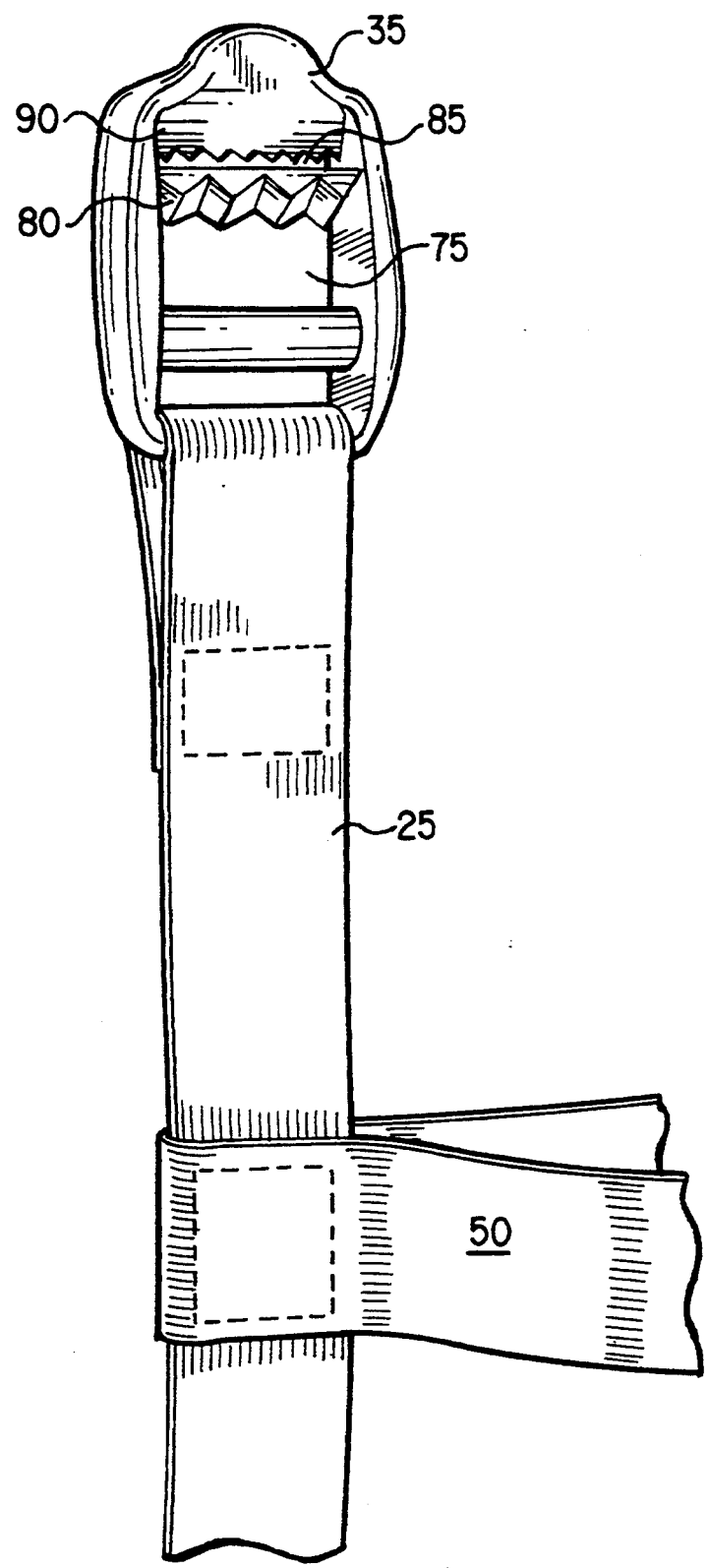
FIG. 3 is an enlarged sectional view of the buckles shown in FIG. 2.

Referring to FIGS. 1-3, a plant carrying device according to one embodiment of the present invention is designated generally by reference numeral 10. Carrying device 10 is illustrated as encompassing an earth ball 15 which is surrounding the roots of plant 20. Carrying device 10 includes a first carrying strap 25 and a second carrying strap 30, each of which has a buckle 35 and 40, respectively, disposed at one end thereof. Carrying straps 25 and 30 are arranged such that they meet, adjoin, or intersect one another at a predetermined intersection point 45. As explained in detail below, intersection point 45 is generally positioned beneath the bottom of earth ball 15 in order to support the weight thereof. Carrying device 10 further includes two carrying handles 50, 55 extending between first and second carrying straps 25, 30. As best illustrated in FIG. 2, carrying handle 50 is between intersection point 45 and the ends of the carrying straps having buckles 35, 40 attached thereto. Carrying handle 55 is positioned between intersection point 45 and the free ends of carrying straps 25, 30.

Carrying straps 25, 30 are constructed from a heavy strapping material having a width of approximately five-eights inch and a length of approximately forty-eight inches, which is sufficient for the carrying of small, thirty to sixty, pound balls. For larger balls, up to one hundred twenty-five pounds, longer lengths of strapping are utilized in order to accommodate the larger ball sizes. The strapping can also have a greater width in order to better accommodate the greater weight of large earth balls, if needed. The strapping material used for carrying straps 25, 30 can also be a starched material, a coated material, or it can be left natural as well. In a preferred embodiment of the invention, a nylon blend material is used for the construction of carrying straps 25, 30, however, any material having a sufficient tensile strength can of course be used. As shown in FIG. 2, the carrying straps are arranged in a crossing pattern so as to form intersection point 45. Preferably, the straps are then fastened to one another by stitching 60 or the like at intersection point 45 in order to securely hold carrying straps 25, 30 in position. This prevents the straps from becoming tangled or shifting during the transportation of the plant.

Carrying handles 50, 55 are also constructed from a heavy strapping material which, in a preferred embodiment, is the same material used tier first and second carrying straps 25, 30. However, carrying handles 50, 55 can be constructed from any strong material or, alternatively, carrying handles 50, 55 could be pre-molded and then attached to the carrying straps. Each carrying handle 50, 55 preferably includes an inner layer 65 and an outer layer 70. Inner layer 65 extending between first and second carrying straps 25, 30 has a length of approximately five inches an rests generally against earth ball 15 during use. As illustrated in FIG. 1, outer layer 70 has a slightly greater length than inner layer 65, approximately six and one-half inches, such that outer layer 70 is not taut against earth ball 15 during use. The extra length thereby forms a space between outer layer 70 and inner layer 65 allowing insertion of a hand therebetween and gripping outer layer 70 for lifting plant 20. In a preferred embodiment of the invention, carrying handles 50, 55 are securely fastened to the carrying straps by stitching or other fastening mechanisms.

As most clearly shown in FIG. 3, buckles 35, 40 are preferably friction buckles which allow the carrying straps to be adjustably secured. Buckles 35, 40 also allow for retightening of the carrying straps should carrying device 10 become loose during transport of the plant. Buckles 35, 40 include a first slot 75 through which a strap is inserted in a direction radially away from the earth ball. The direction of the strap is then reversed such that it is overlying itself, and the strap is threaded through a second slot 85 in the buckle. Gripping teeth 80 above first slot 75 and gripping teeth 90 above second slot 85 provide frictional resistance to maintain the strap threaded through the buckle with the desired degree of tightness. Other types of buckles or fastening devices could of course be used to connect the free ends of opposing straps after they have been wrapped around the earth ball of the plant.

Figure 4:
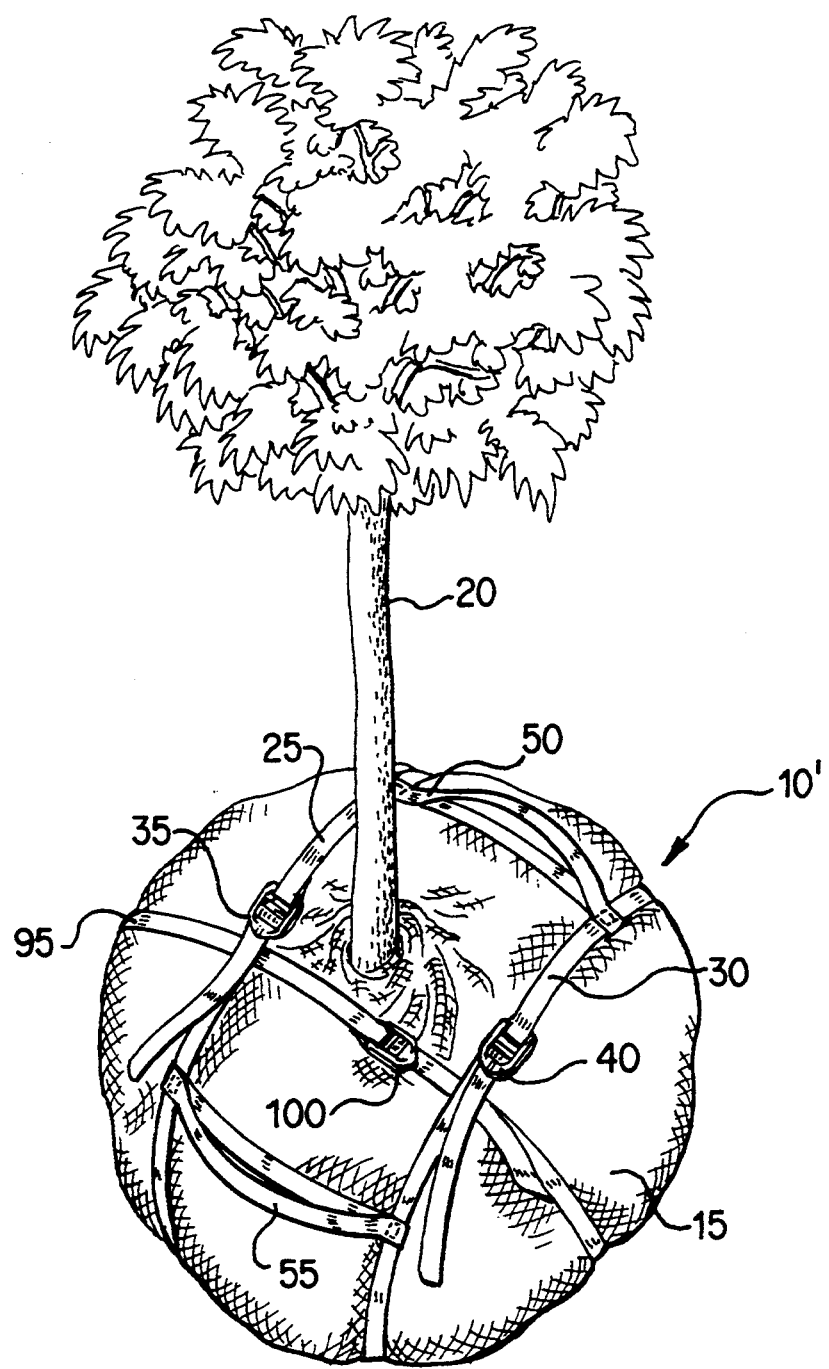
FIG. 4 is a top perspective view of the plant carrying device according to another embodiment of the present invention when fastened around a balled plant.
Figure 5:
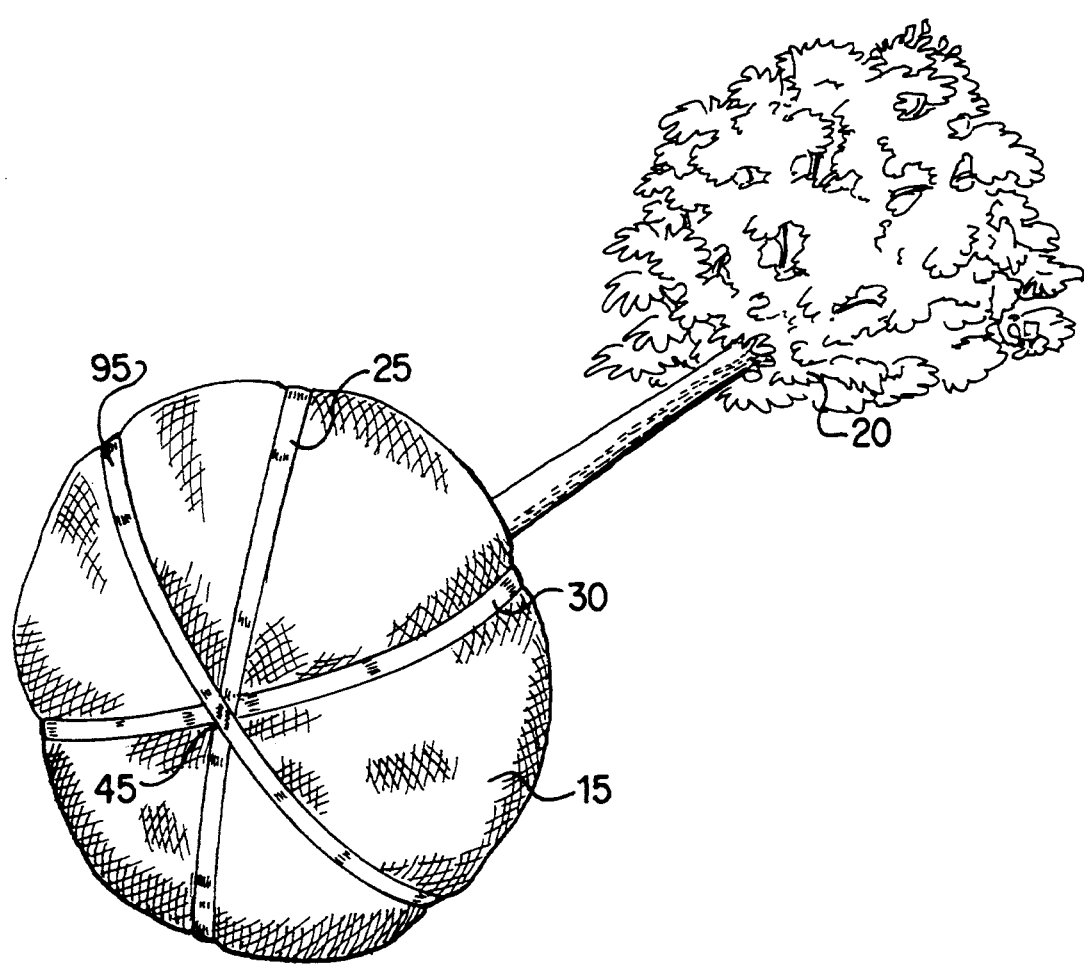
FIG. 5 is a bottom perspective view of the plant carrying device shown in FIG. 4 when fastened around the balled plant.

Referring to FIGS. 4 and 5, a carrying device according to a preferred embodiment of the present invention is designated generally by the reference numeral 10'. Carrying device 10' includes a first carrying strap 25, a second carrying strap 30 and further includes a third carrying strap 95 which has a third fastening buckle 100 attached at one end thereof. Thus, when carrying device 10' is secured around earth ball 15, first and second carrying straps 25, 30 are secured as described above, and third carrying strap 95 is further secured around earth ball 15 and the free end thereof is fastened through third buckle 100. As shown in FIG. 5, third carrying strap 95 also intersects the first and second carrying straps at intersection point 45 at a location generally beneath the bottom of earth ball 15. Third carrying strap 95 provides additional support for earth ball 15 when transporting plant 20. That is to say, the presence of third carrying strap 95 in carrying device 10' provides for a more even distribution of forces and thereby reduces the deformation of earth ball 15 which may be experienced when using the two carrying strap version of carrying device 10. Third carrying strap 95 also is particularly useful for transporting particularly large earth balls, such as those weighing over 100 pounds, such that a plant is sufficiently stable when it is thereafter lifted by carrying handles 50, 55.

Figure 6:
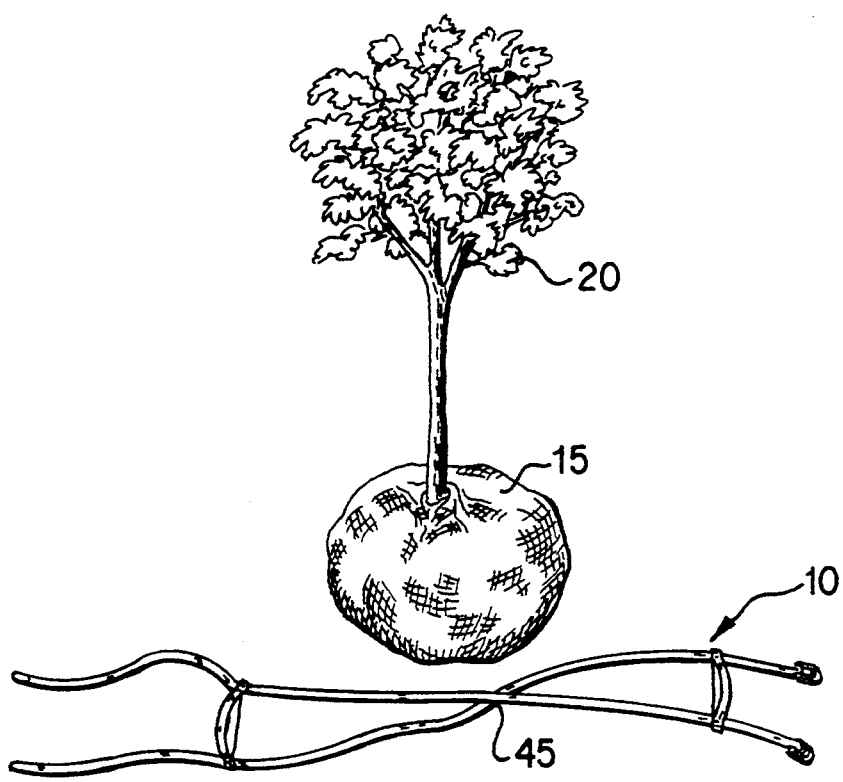
FIG. 6 is a schematic diagram showing the plant carrying device according to FIG. 1 prior to being fastened around a balled plant.
Figure 7:
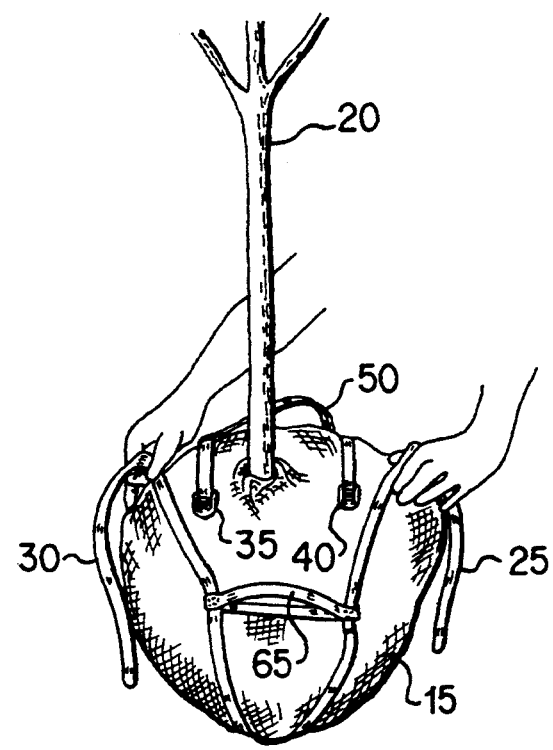
FIG. 7 is a schematic diagram showing the plant carrying device being fastened around a balled plant.
Figure 8:
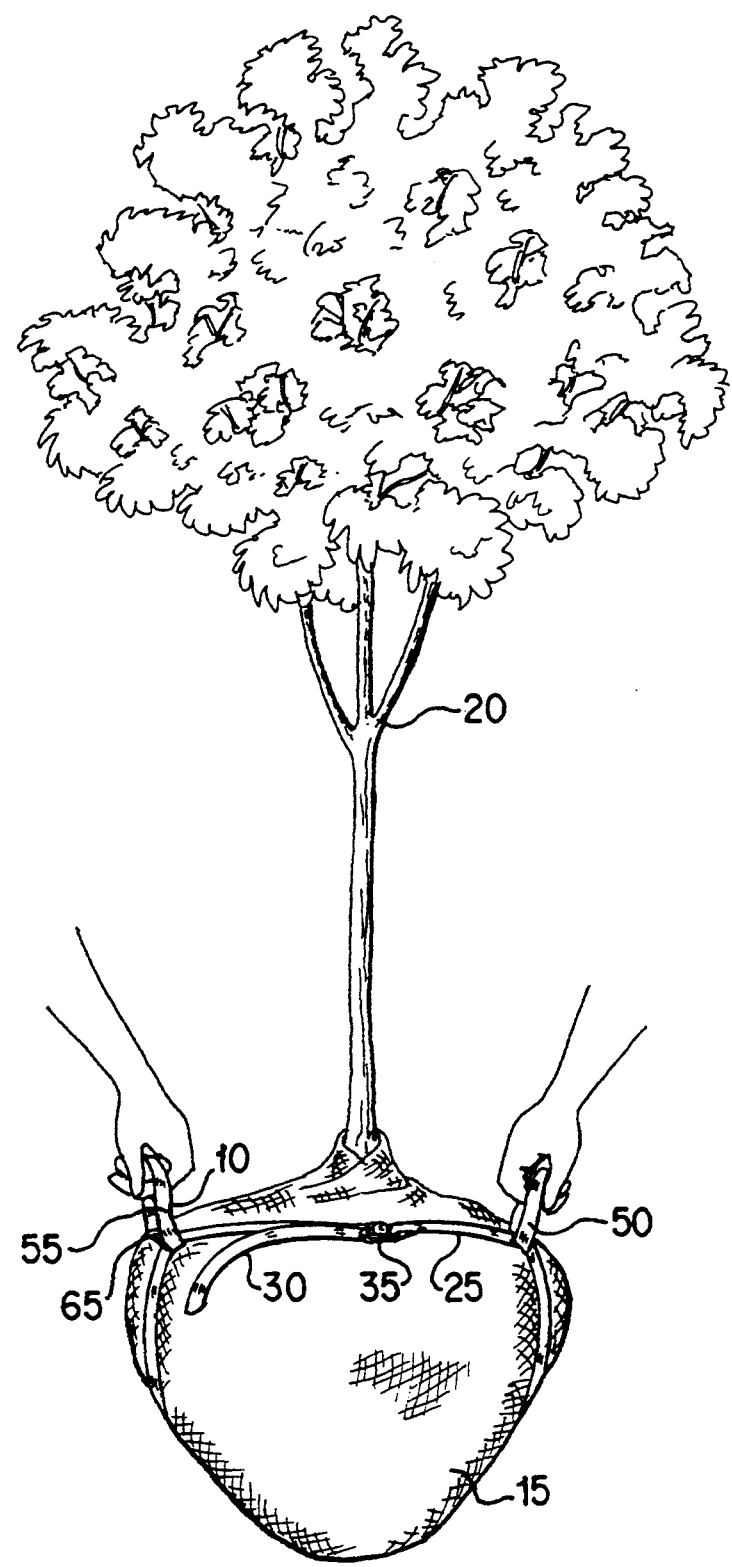
FIG. 8 is a schematic diagram showing the plant carrying device being used for lifting a plant.

FIGS. 6-8 best illustrate the use of carrying device 10 or 10' according to the present invention, carrying device 10 being shown merely for illustrative purposes. As shown in FIG. 6, after plant 20 is balled and burlapped, carrying device 10 is placed in a position adjacent thereto. Plant 20 is either left lying horizontally on the ground or standing in the field generally from which it was uprooted. Plant 20 is then rotated up into a vertical position or otherwise moved to a position on top of carrying device 10 such that the bottom center of earth ball 15 will be centered on intersection point 45 of carrying device 10. Referring to FIG. 7, carrying straps 25, 30 are then positioned around earth ball 15 and the free end of each strap is inserted into buckle 35, 40 on the other end of the respective carrying strap. This is repeated for all the straps, including a third carrying strap if such is provided. Carrying straps 25, 30 are then pulled or cinched to obtain a snug position around the periphery of earth ball 15. When carrying device 10 has been attached to earth ball 15, carrying handles 50, 55 will be positioned in the area generally at the top shoulder of ball 15, thereby providing for easy access. As shown in FIG. 8, plant 20 can then be picked up by carrying handles 50, 55, thereby transferring all the weight to the most stable part of the plant, which is me bottom of the earth ball. As illustrated, when utilizing carrying device 10 in accordance with the present invention, the plant top is not touched, thereby eliminating damage that is caused by the opposing stresses resulting from the plant being lifted by the top portion thereof.

When handling balled and burlapped plants, only one person may be required to carry a plant in the lower weight ranges, i.e., less than sixty pounds. With traditionally corded balled plants and other prior art carrying devices as well this is still a very awkward and difficult task, however, since the balled plant does not provide an easy mechanism for lifting the plant. This can also be a very dangerous task causing many back injuries due to improper lifting. In the present invention, carrying device 10 or 10' provides a handle 50, 55 on each side of the ball which thereby allows one person to pick up small, thirty to sixty pound balls by simply bending at the knees and lifting with both handles. Larger earth balls are carried by two persons, one on each side lifting the plant by the handle, as illustrated in FIG. 8.

The present invention allows for ease of handling not only for the producer or grower of plants, trees or the like, but also for the retail garden center and the ultimate homeowner as well. With carrying device 10 or 10' still attached, the ultimate consumer can easily angle or lower the plant into a hole for replanting, and the carrying device 10 or 10' can either remain on the balled and burlapped plant or be removed for recycling by the retail garden center.

Carrying devices 10 and 10' thus provide an easy and simple mechanism for carrying field-grown, balled and burlapped plants or trees, eliminating ball damage, and thereby reducing the mortality of plants. Carrying devices 10 and 10' further reduce the physical stresses of manually lifting and carrying balled and burlapped plants and provide for easy loading, transporting and replanting of the field-grown plants. Furthermore, carrying devices 10 and 10' are easily applied to the earth ball and removed therefrom or, alternatively, they can remain attached to the earth ball when replanting the field-grown plant or tree.

It will be obvious to one of ordinary skill in the art that numerous modifications may be made without departing from the true spirit and scope of the present invention, which is to be limited only by the appended claims.

We claim:

1. A plant carrying device comprising:
   a first carrying strap including a free end and a first fastening device secured at the other end thereof;
   a second carrying strap including a free end and a second fastening device secured at the other end thereof; said first and second carrying straps crossing over one another at an intersection point; two carrying handles extending between said first and second carrying straps and being spaced from a balled plant for easy gripping, one said handle being disposed on each side of said intersection point;
   wherein said first and second carrying straps are fastenable around the balled plant having a plant trunk such that said first fastening device is directly fastened to said free end of said second strap and said second fastening device is directly fastened to said free end of said first strap, one said carrying strap being fastened on each side of the trunk of the balled plant and an uppermost central region between said carrying straps remaining clear in order to accommodate the trunk; and
   wherein said intersection point is positionable beneath the balled plant such that one said carrying handle is thereby positioned on each side of the balled plant for lifting and carrying the balled plant without significant damage to the balled plant.

2. The plant carrying device according to claim 1 wherein said carrying straps are securely fastened to one another at said intersection point.

3. The plant carrying device according to claim 2 wherein said carrying straps are fastened to one another at said intersection point by stitching.

4. The plant carrying device according to claim 1 wherein said carrying handles are equally spaced on opposing sides of said intersection point.

5. The plant carrying device according to claim 4 wherein said carrying handles each include a double thickness of material overlapping and extending the entire distance between said carrying straps.

6. The plant carrying device according to claim 5 wherein said carrying handles each include an inner strap facing the balled plant and a slightly longer outer strap, said inner strap being taut against the balled plant and said outer strap loosely protruding outward from the balled plant such that said inner and outer straps form a strong, comfortable, and easily grasped surface for each said carrying handle.

7. The plant carrying device according to claim 1 wherein said carrying straps are formed from a strong, flexible material.

8. The plant carrying device according to claim 7 wherein said carrying handles are also formed from the strong, flexible material.

9. The plant carrying device according to claim 1 wherein said first and second fastening devices include adjustable buckles such that said first and second carrying straps can be snugly fastened around the balled plant.

10. The plant carrying device according to claim 1 further comprising a third carrying strap crossing over said first and second carrying straps at said intersection point and including a free end and a third fastening device at the other end thereof, said third carrying strap being fastenable around the balled plant such that said third fastening device is adjustably connected to said free end of said third carrying strap.

11. A method for carrying balled plants comprising the steps of:
    positioning on a flat surface a plant carrying device including at least two carrying straps having a fastening device at one end thereof and crossing at an intersection point and a carrying handle disposed on each side of the intersection point extending between the carrying straps;
    standing a balled plant having a trunk upright onto the intersection point of the carrying straps;
    securing each carrying strap around the balled plant such that the straps are snugly held in place on each side of the trunk of the balled plant;
    grasping the carrying handles which are spaced from the balled plant; and
    thereafter, lifting the balled plant by the two carrying handles and carrying the balled plant to the desired location without damaging the roots thereof.

12. The method according to claim 11 wherein said securing step includes sliding the carrying strap through the fastening device and pulling the strap taut such that the balled plant is secured.

13. The method according to claim 12 wherein the carrying device includes first and second carrying straps having first and second fastening devices at one end thereof and said securing step includes securing the first fastening device to a free end of the second carrying strap and securing the second device to a free end of the first carrying strap.

14. A plant carrying system for lifting, transporting and loading a balled plant having a plant trunk, said system comprising:
    a first carrying strap having first and second ends thereof;
    a second carrying strap having first and second ends thereof;
    said first and second carrying straps adjoining one another at a connection point;
    first fastening means for securing one said end of said first strap directly to one said end of said second strap around the balled plant such that said connection point is underneath the bailed plant;
    second fastening means for securing another said end of said first strap directly to another said end of said second strap and around the balled plant;
    first and second handle means secured to at least one of said carrying straps and spaced from the balled plant for lifting on opposing sides of the balled plant with said first and second fastening means secured around the balled plant; and wherein said first and second carrying straps are secured on opposing sides of the trunk of the balled plant such that an uppermost central region between said carrying straps remains clear in order to accommodate the plant trunk.

15. A plant carrying system according to claim 14 wherein said first fastening means is attached to said first carrying strap and said second fastening means is attached to said second carrying strap.

16. A plant carrying system according to claim 14 wherein said first and second fastening means include friction buckles.

17. A plant carrying system according to claim 14 wherein said first and second handle means include strap members secured to at least one of said carrying straps.

18. A plant carrying system according to claim 14 further comprising a third carrying strap having first and second ends thereof and third fastening means for securing said third carrying strap around the balled plant.

19. A plant carrying system according to claim 18 wherein said third carrying strap intersects said first and second carrying straps at said connection point.

* * * * *